(12) United States Patent
Parris

(10) Patent No.: US 12,551,821 B2
(45) Date of Patent: Feb. 17, 2026

(54) LIQUOR DISTILLATION SYSTEM AND METHOD THEREOF

(71) Applicant: Graeme Sidney Parris, Temecula, CA (US)

(72) Inventor: Graeme Sidney Parris, Temecula, CA (US)

( * ) Notice: Subject to any disclaimer, the term of this patent is extended or adjusted under 35 U.S.C. 154(b) by 818 days.

(21) Appl. No.: 17/845,932

(22) Filed: Jun. 21, 2022

(65) Prior Publication Data

US 2022/0401850 A1 Dec. 22, 2022

Related U.S. Application Data

(60) Provisional application No. 63/213,056, filed on Jun. 21, 2021.

(51) Int. Cl.
| | |
|---|---|
| *B01D 3/02* | (2006.01) |
| *B01D 3/00* | (2006.01) |
| *B01D 3/04* | (2006.01) |
| *B01D 5/00* | (2006.01) |
| *C12H 6/02* | (2019.01) |

(52) U.S. Cl.
CPC .............. *B01D 3/002* (2013.01); *B01D 3/02* (2013.01); *B01D 3/04* (2013.01); *B01D 5/0063* (2013.01); *C12H 6/02* (2019.02)

(58) Field of Classification Search
CPC . B01D 3/002; B01D 3/02; B01D 3/04; B01D 5/0063; C12H 6/02
See application file for complete search history.

(56) References Cited

U.S. PATENT DOCUMENTS

| | | | |
|---|---|---|---|
| 263,852 A | 9/1882 | Burcey | |
| 2,012,365 A * | 8/1935 | Werner | B01D 3/001 204/278 |
| 4,345,972 A | 8/1982 | Hannebaum et al. | |
| 5,558,748 A * | 9/1996 | Dugan | F28F 13/185 203/87 |
| 10,315,127 B2 * | 6/2019 | Mösslein | B01D 3/003 |
| 11,400,388 B2 * | 8/2022 | Adjabeng | B01D 1/223 |
| 2005/0205241 A1 * | 9/2005 | Goodson | F28D 15/00 257/E23.098 |
| 2017/0312649 A1 * | 11/2017 | Mösslein | B01D 3/02 |
| 2019/0255456 A1 * | 8/2019 | Banik | B01D 3/004 |
| 2020/0016506 A1 * | 1/2020 | Adjabeng | B01D 3/02 |
| 2022/0401850 A1 * | 12/2022 | Parris | B01D 3/002 |

FOREIGN PATENT DOCUMENTS

CN 104263620 A 1/2015

* cited by examiner

*Primary Examiner* — Jonathan Miller
(74) *Attorney, Agent, or Firm* — Innovent Law P.C.; Karima Gulick

(57) ABSTRACT

A liquor distillation system, comprising one or more channeled loops fluidly couplable to a boiler and a condenser, the condenser adapted to condense alcoholic vapors from a heated liquor wherein the one more channeled loops include an entrance point, an exit point, a split point, and a recombination point such that the heated liquor enters the one or more channeled loops from the entrance point, to the split point where the heated liquor is split into two separate opposite subchannels and recombined at the recombination point; one or more connection pipes adapted to connect the one or more channeled loops to another channeled ring; one or more drain valves; and a liquor outlet.

18 Claims, 11 Drawing Sheets

LIQUOR DISTILLATION SYSTEM AND METHOD THEREOF

CROSS-REFERENCE TO RELATED APPLICATION

This application claims priority of U.S. Provisional Application No. 63/213,056, filed Jun. 21, 2021, entitled: Liquor Distillation System and Method Thereof by Graeme Parris.

BACKGROUND OF THE INVENTION

1. Field of the Invention

This invention relates to a liquor distillation system and method. More particularly, the invention relates to a device useful in distilling liquor all while enhancing the flavors of the liquor using a multi-stage liquor distillation system and flow splitting.

2. Description of the Related Art

In markets today, there are very limited products offered for liquor distillation all while enhancing the flavors of the liquor. In fact, the current products and methods strip the alcohol and liquor of its natural flavors and aromas through distillation.

Other products and methods offered for liquor distillation systems require large-scaled equipment and a great stock of raw materials.

In addition, these distillation systems of the prior art do not suggest the simplicity and effectiveness of the present disclosure.

Currently, there are no useful alternatives that effectively assist in distilling liquor efficiently all while allowing the liquor to retain its flavors and aromas or enhance the aromas. As will be disclosed below, the present disclosure addresses these needs and covers a system and method for a distillation tower, using a newly designed process for filtering and recombining the flow of liquor vapors to increase aroma and retain flavor with alcohol production.

SUMMARY OF THE DISCLOSURE

In one aspect, the present disclosure is embodied as a scalable distillation tower and distillation system, using a newly designed process for filtering and recombining the flow of vapors to increase aroma and retain flavor with alcohol production.

In one embodiment, the present disclosure includes multiple flow-splitting stages or channeled loops that allow for a distillate product to get filtered up to 6-7 times all while retaining full flavors at each stage or channeled loop.

In an alternative embodiment, the present disclosure is a liquor distillation system comprising one or more stages or channeled loops fluidly couplable to a boiler and a condenser. The condenser is adapted to condense alcoholic vapors from a heated liquor and the channeled loops include an entrance point, an exit point, a split point, and a recombination point. The heated liquor enters the one or more channeled loops from the entrance point and travels to the split point where the heated liquor is split into two separate and opposite subchannels and recombined at the recombination point. One or more connection pipes are adapted to connect the channeled loops to one another. The system can also include a reflux subsystem, at least one drain valve, and a liquor outlet through which the distilled liquor is dispensed.

In one embodiment, the liquor distillation system is adapted to connect to an external pot or comes with a pot as part of the system. The pot is connectable to a heat source such that the temperature and pressure of the liquor within the system can be raised, and the liquor vaporated through the channeled loops or stages where the flow of liquid and/or vapors is forced into two different opposite directions before being recombined. The channeled loops or stages can include copper elements to increase the filtration, remove oils, contaminates and esters without stripping the liquor liquid and vapors of aromas and flavors.

In some embodiments, the liquor distillation system includes quick release mechanisms for coupling of various components. These can be quick release clamps, latches or other equivalent coupling mechanisms for ease of cleaning. These can be throughout the system, on the connection pipes and a part of the stages or channeled loops such that the system can be easily disconnected, cleaned and reconnected. A stage is defined as a channeled loop.

In an alternative embodiment, the liquor distillation system includes a copper element in the channeled loops. This can be a copper lining, a bubble plate and/or a copper mesh adapted to reduce sulfur and enhance the flavors of the distilled liquor. In some embodiments, the entire stage or channeled loop can be made out of copper, while in other embodiments, only portions of the stage or channeled loop includes copper for purification and filtration. In some embodiments, copper elements or tightly wound copper mesh is at the corner of each channeled loop or stage to ensure that the vapors and fluids go through the copper elements in the corner at a slower rate for additional purification, filtration and distillation.

In most embodiments, the liquor distillation system has channeled loops that split into two separate and opposite subchannels, these may be equidistant. In other embodiments, a plurality of channeled loops are connected via connection pipes. In some embodiments, the channeled loops are vertically connected and vertically offset from one another via horizontal connection pipes.

The present disclosure can use both a pot still subsystem and reflux still subsystem mechanism. In the pot still subsystem, the subsystem includes a kettle or pot or equivalent with a large bell of secondary cavity above the narrowed discharge area from the kettle or pot. This is initially for the aromas to mingle and enhance, yet not get removed from excessive variations of filtration. This area or secondary chamber is usually packed with copper of some sort, and is the way that unwanted flavors are removed or at best reduced. With a pot still, there is a slow flow of vapors.

The reflux still subsystem can include a smaller diameter than a bell of the equivalent volume pot still. It utilizes flutes or bubble plates to force the vapors into contact with the copper. A reflux still works at much higher pressures than a pot still, and requires the vapors to pass through the liquid which builds on the top side of each flute or bubble plate. This forces the vapors to come into contact with the unwanted and previously removed contaminates. This process is a forced refining process. The vapors are forced through small opening on the bottom side of each plate, and restricts the flow.

In the present disclosure, the liquor and liquid vapors are confined into a smaller area (such as the stages or channeled loops) to combine the aromas better, then reduce the pressure and slow the flow through the copper which is used as a filtration. This allows for the unwanted oils and esters which are getting transported by the vapors to get removed, before the vapors are compressed to flow through the narrower opening again and recombination point of the stages and channeled loops. By using the flow splitting mechanism of the present disclosure, the liquor distillation system allows for the reduction of pressure for slowed filtration with minimal potential for aroma reduction. By dividing the flow of liquor and liquids into subchannels and substages, then filtering it twice or more per side before recombining the flow and repeating this for a total of 3 times or more, the liquor distillation system of the present disclosure allows for a clean yet full aroma and flavored spirit.

In accordance with one form of this disclosure, there is provided a method for distilling liquor using a liquor distillation system and comprising the steps of a) filling a pot with a liquor; b) placing a top attached to the liquor distillation system over the pot; c) connecting the pot to a heat source wherein when the liquor is being heated, the liquor vapors travel through one or more channeled loops wherein the liquor vapors are split into two opposite direction and reconnected at a recombination point for enhanced flavor prior to travelling to a sequential channeled loop; and wherein the distilled liquor vapors further travel through a condenser prior to exiting the system via a liquor outlet.

Before explaining the various embodiments of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its operating advantages and the specific objects attained by its uses, reference should be made to the accompanying drawings and descriptive matter in which there are illustrated preferred embodiments of the invention.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the drawing figures may be in simplified form and might not be to precise scale.

The same elements or parts throughout the figures of the drawings are designated by the same reference characters, while equivalent elements bear a prime designation.

DETAILED DESCRIPTION OF THE INVENTION

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
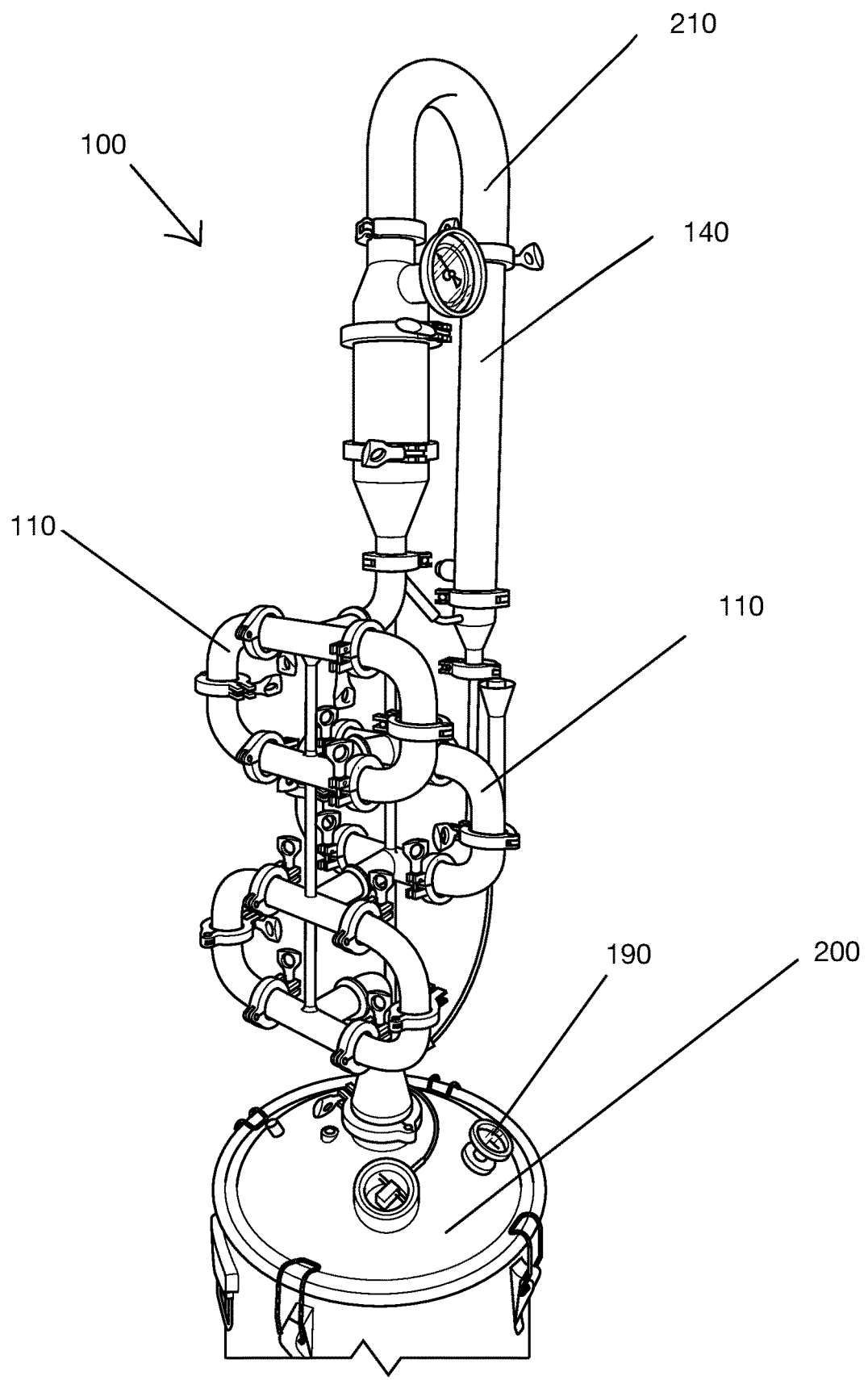
FIG. 1 is a perspective view of one embodiment of the liquor distillation system according to the present disclosure.

Referring now to the drawings and the characters of reference marked thereon, FIG. 1 shows one embodiment of the liquor distillation system. The Figure shows the liquor distillation system 100 comprising a plurality of channeled loops 110 or stages 110 fluidly couplable to a boiler 170 and a condenser 140. The condenser is adapted to condense alcoholic vapors from a heated liquor.

Figure 2:
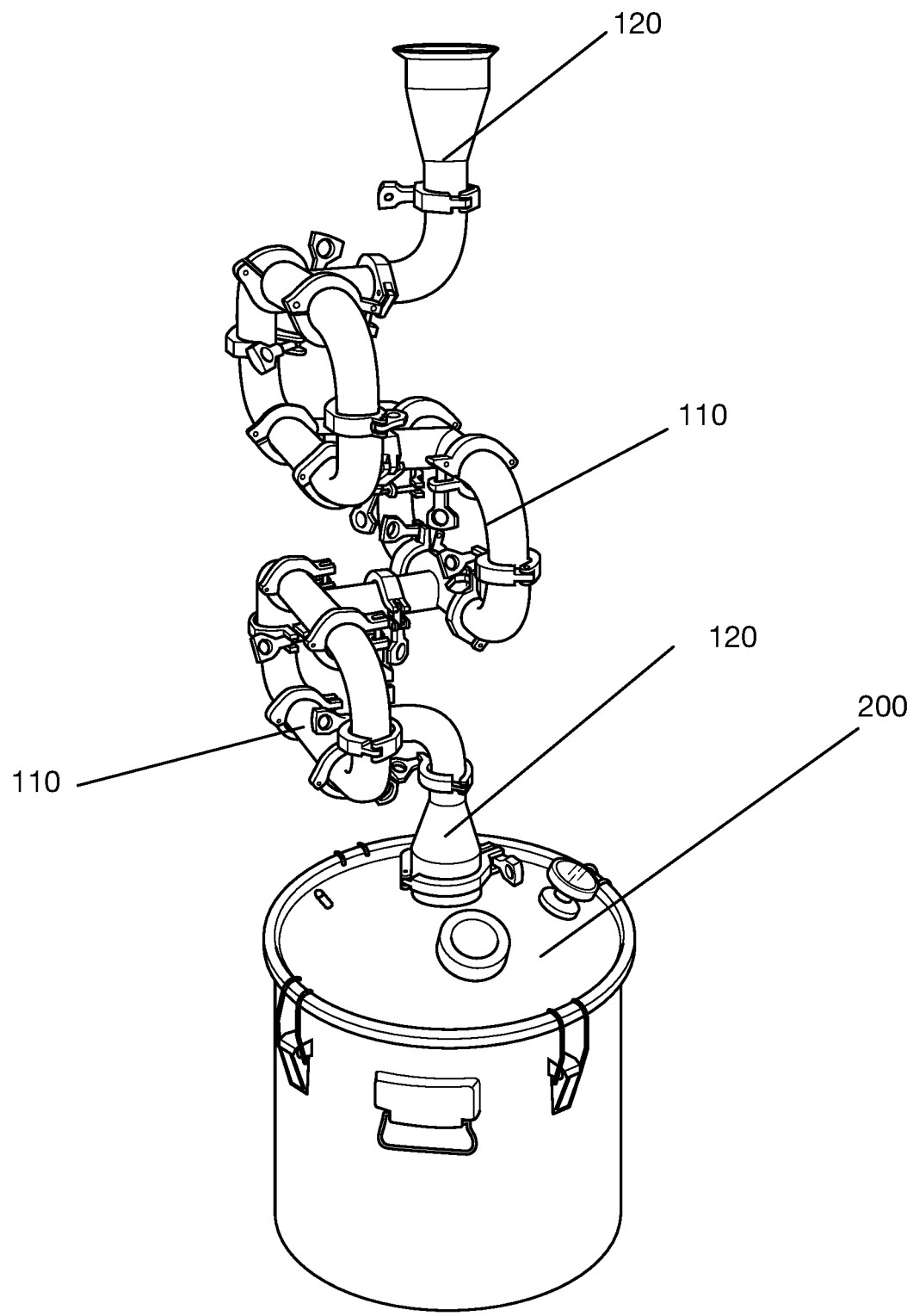
FIG. 2 is another perspective view of an alternative embodiment of the liquor distillation system of the present disclosure.
Figure 3:
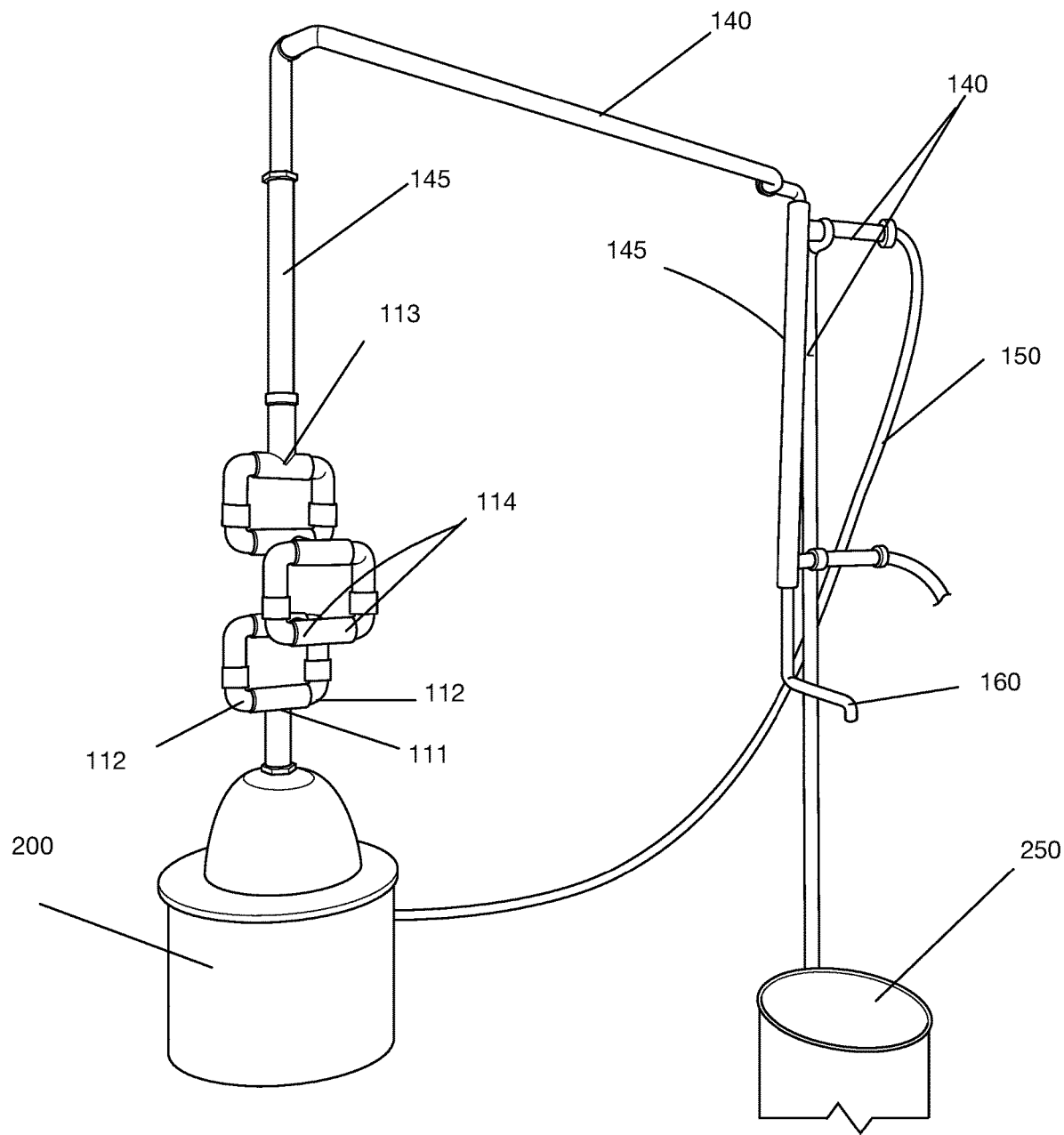
FIG. 3 is a perspective view of another embodiment of the liquor distillation system of the present disclosure including system outlet and drain.
Figure 4:
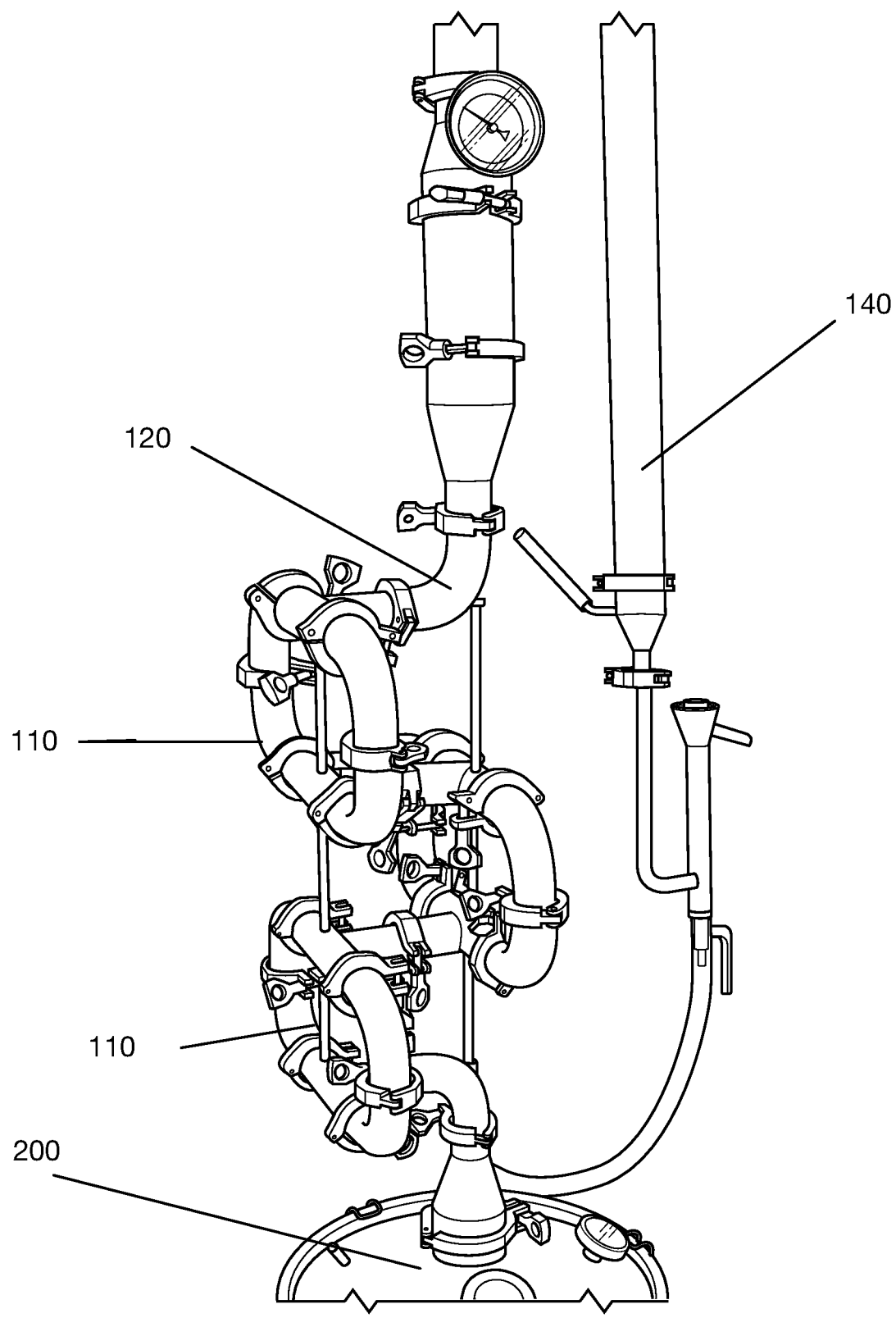
FIG. 4 is a side perspective view of the liquor distillation system of the present disclosure showing details of the channeled loops and connection pipes.
Figure 5:
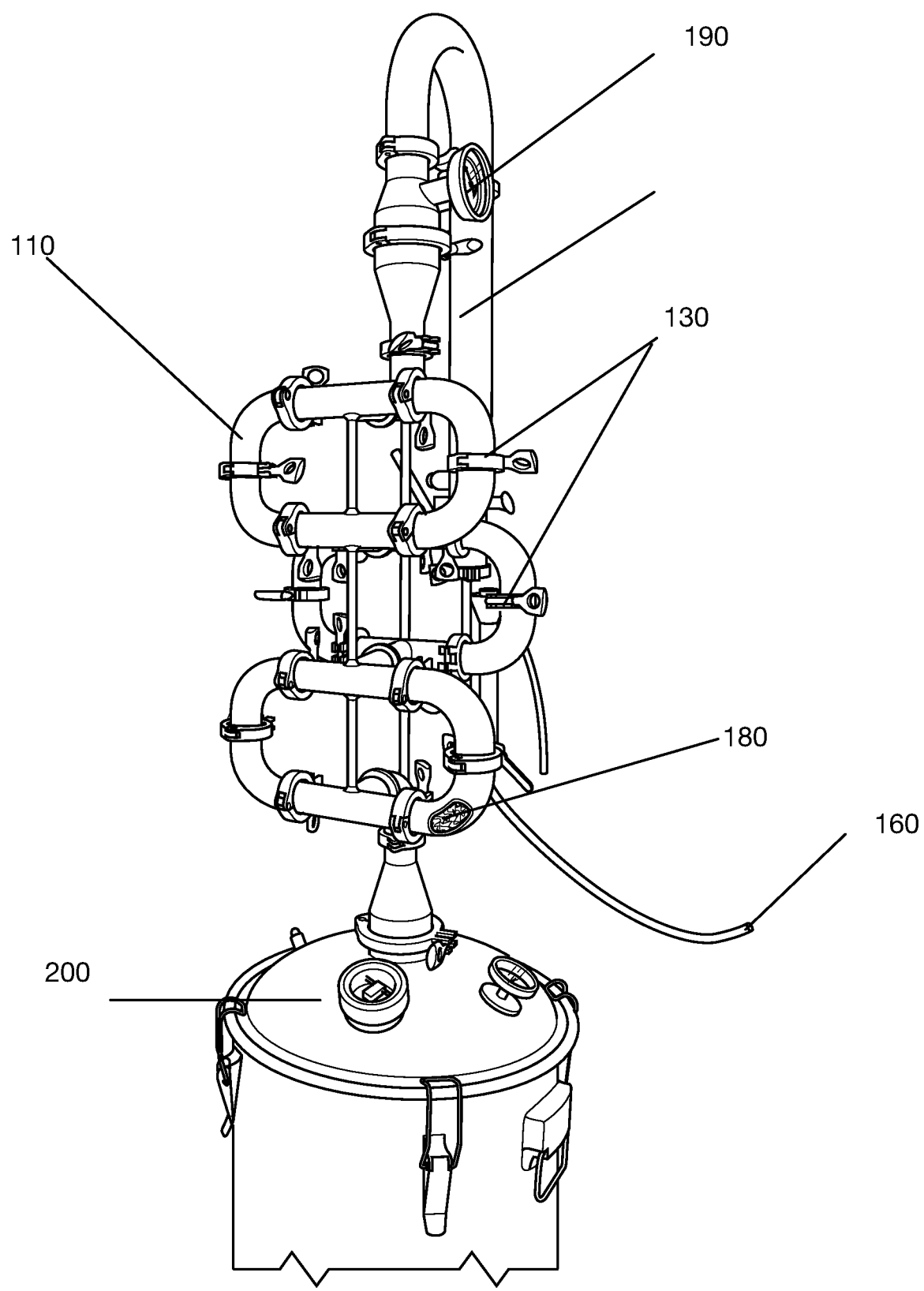
FIG. 5 is a front perspective view of the liquor distillation system of the present disclosure showing details of the channeled loops and connection pipes.
Figure 6:
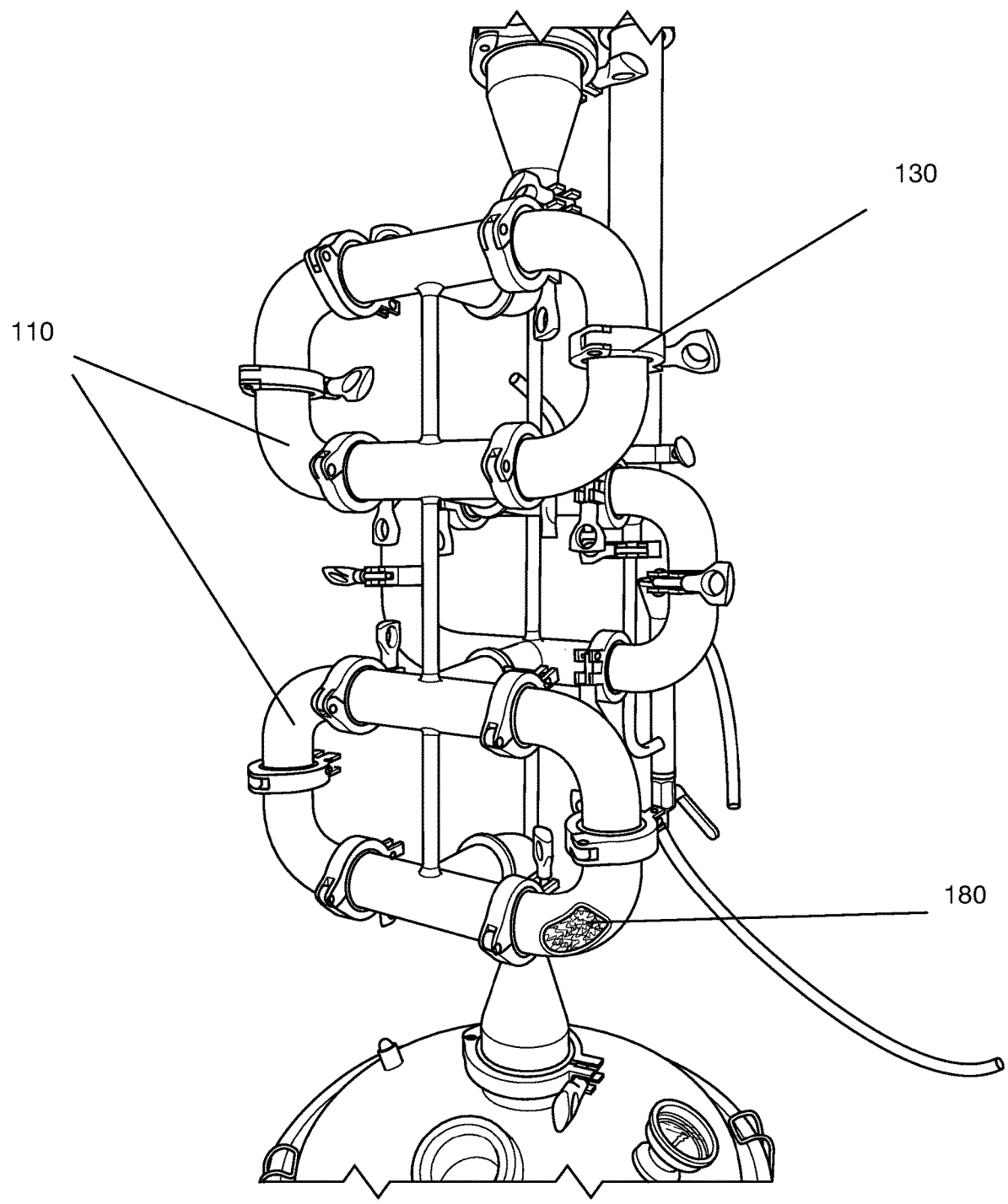
FIG. 6 is a front perspective view of the liquor distillation system showing details of the copper element and copper mesh inside the stages and channeled loops.
Figure 7:
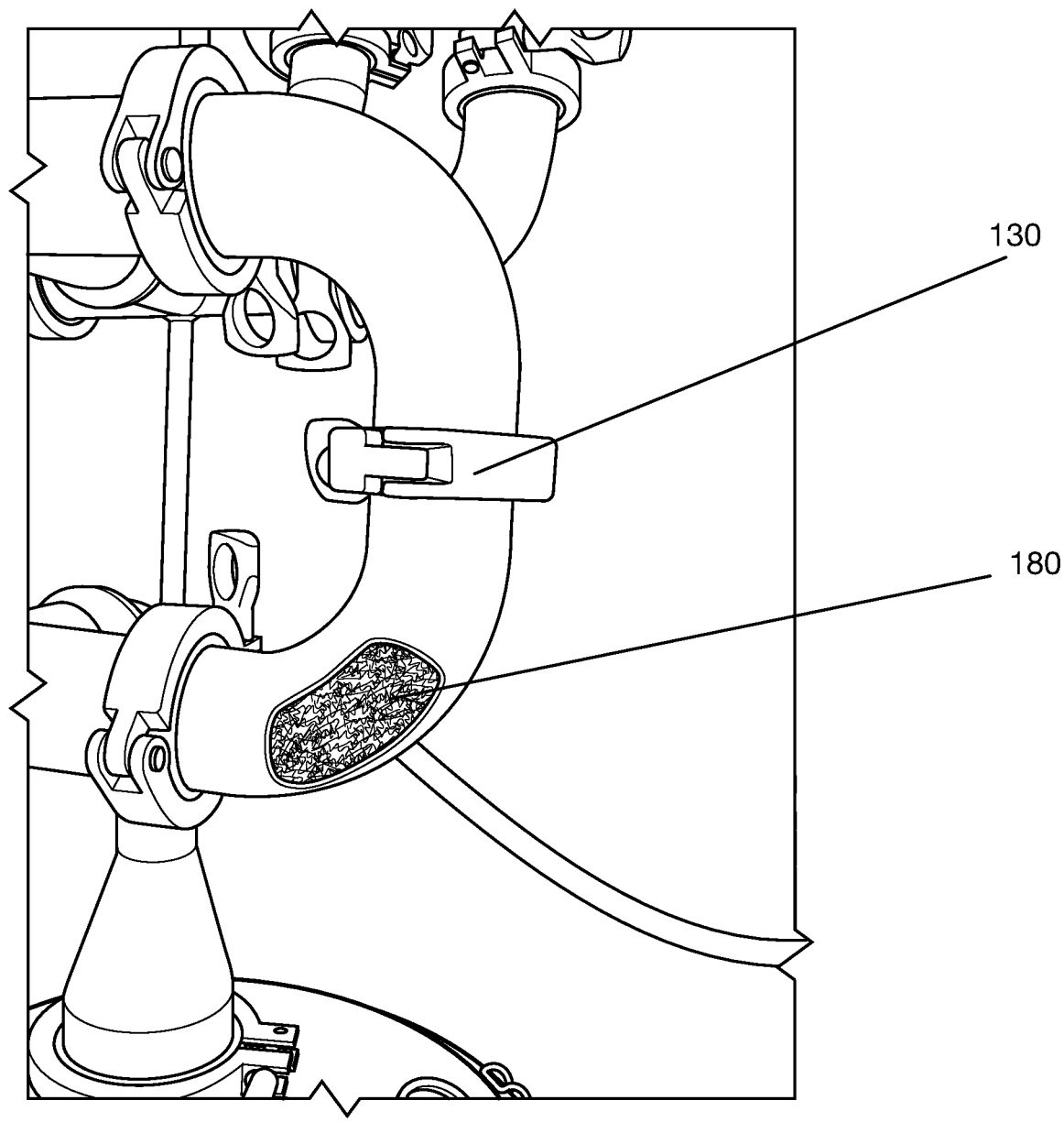
FIG. 7 is a close-up front view of the copper element within the stages and channeled loops.
Figure 8:
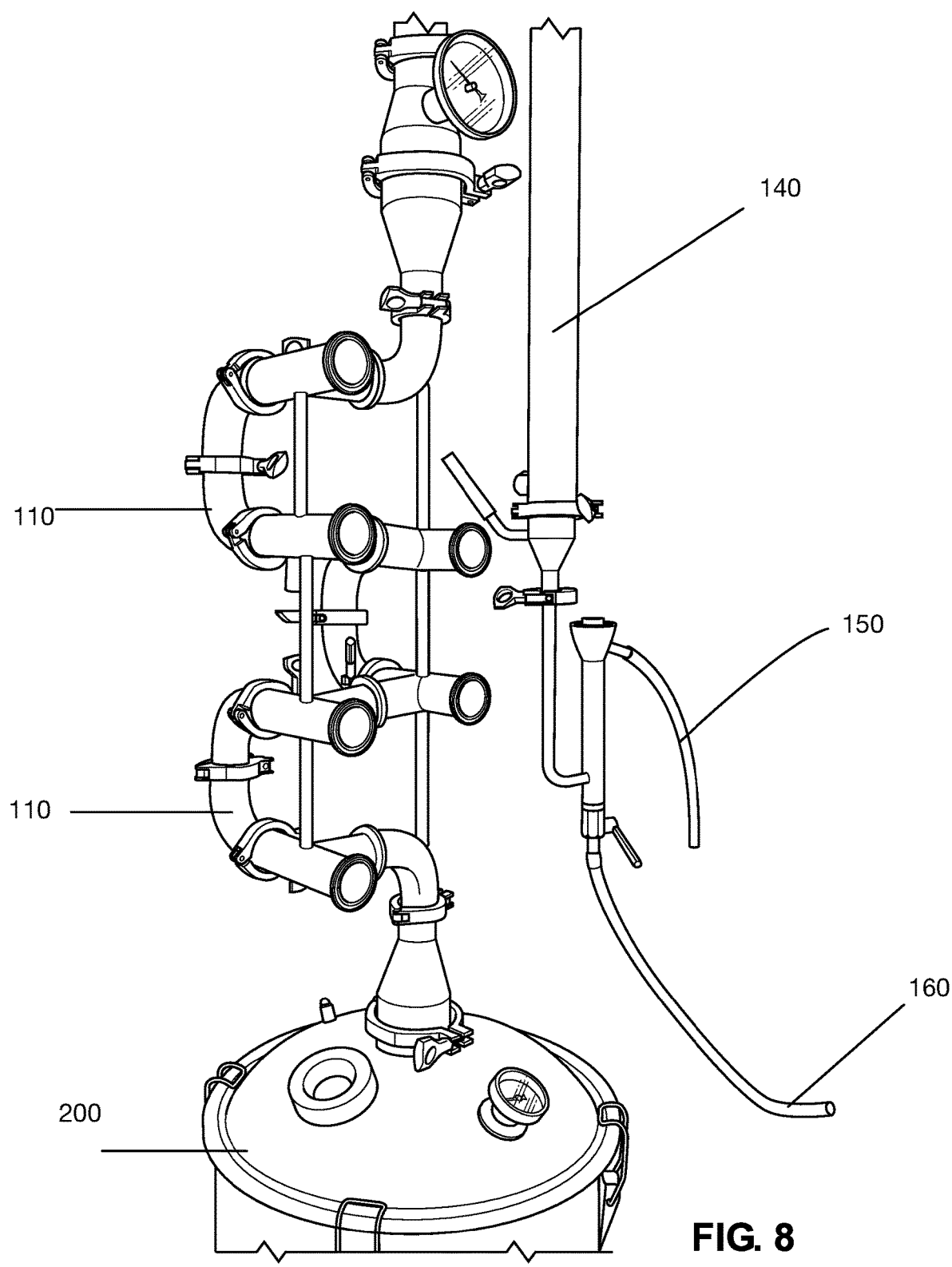
FIG. 8 is detailed view of semi-disconnected stages and channeled loop.
Figure 9:
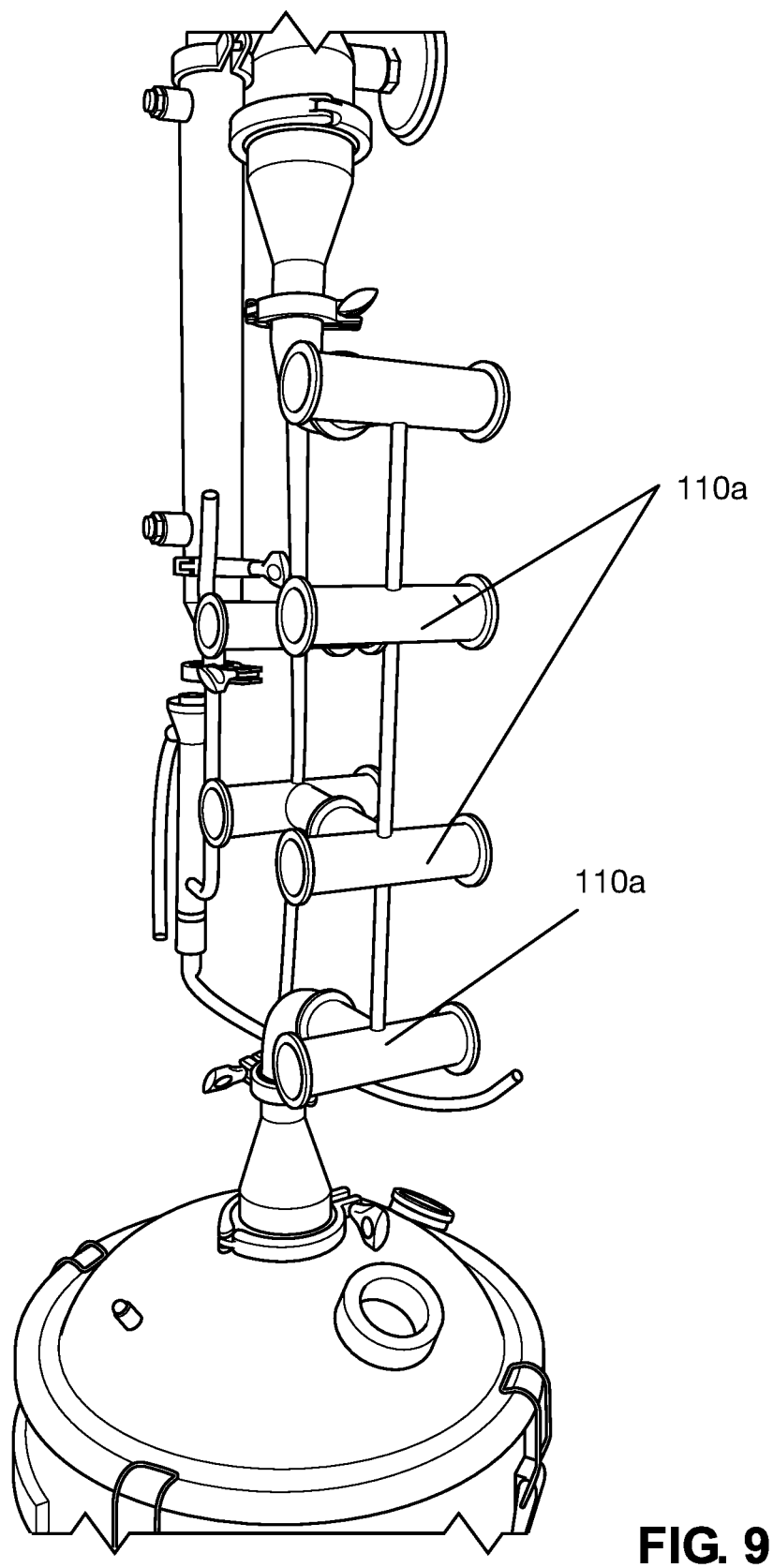
FIG. 9 shows a disconnected liquor distillation system.
Figure 10:
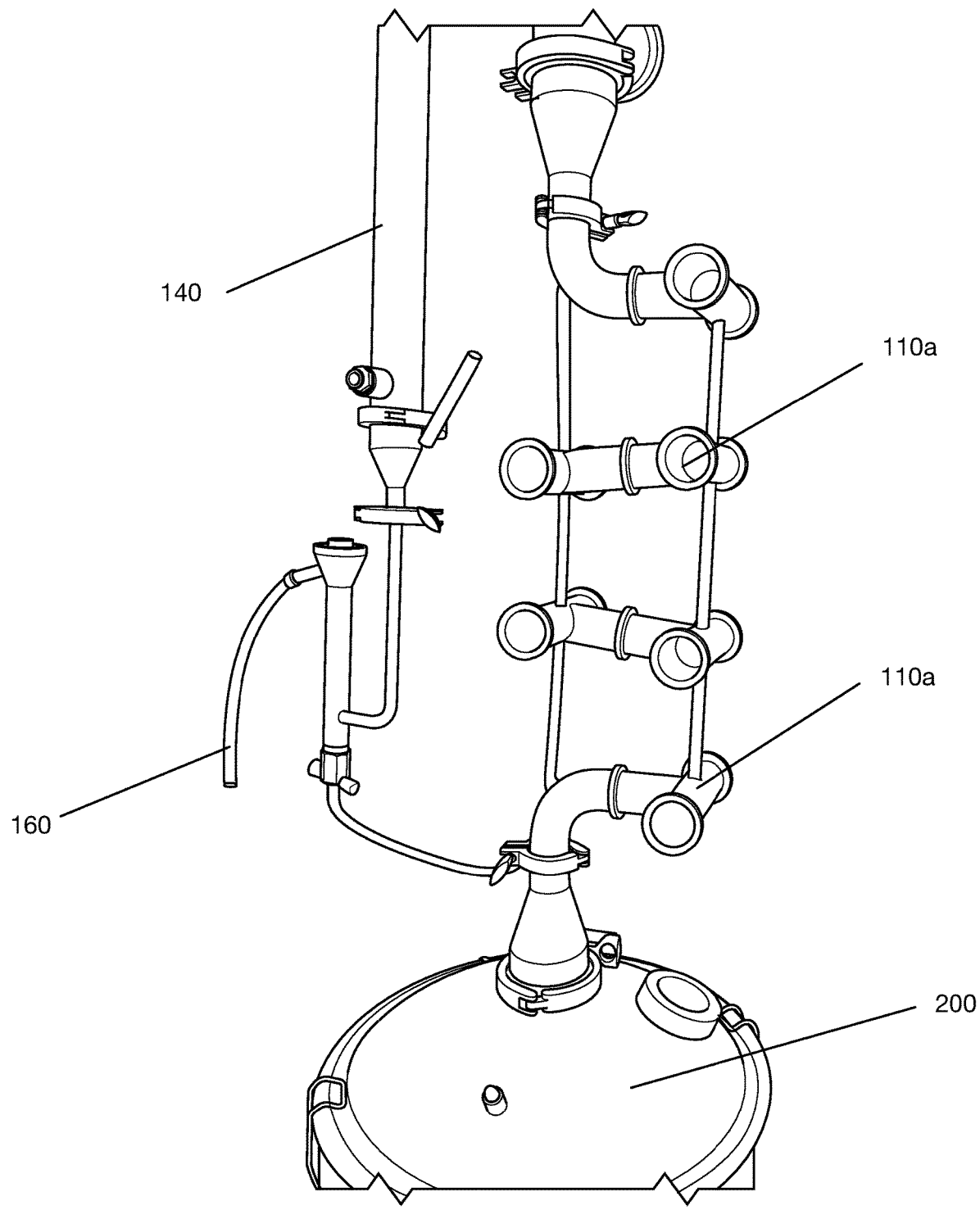
FIG. 10 shows another disconnected liquor distillation system with a pot and portion of the system outlet.
Figure 11:
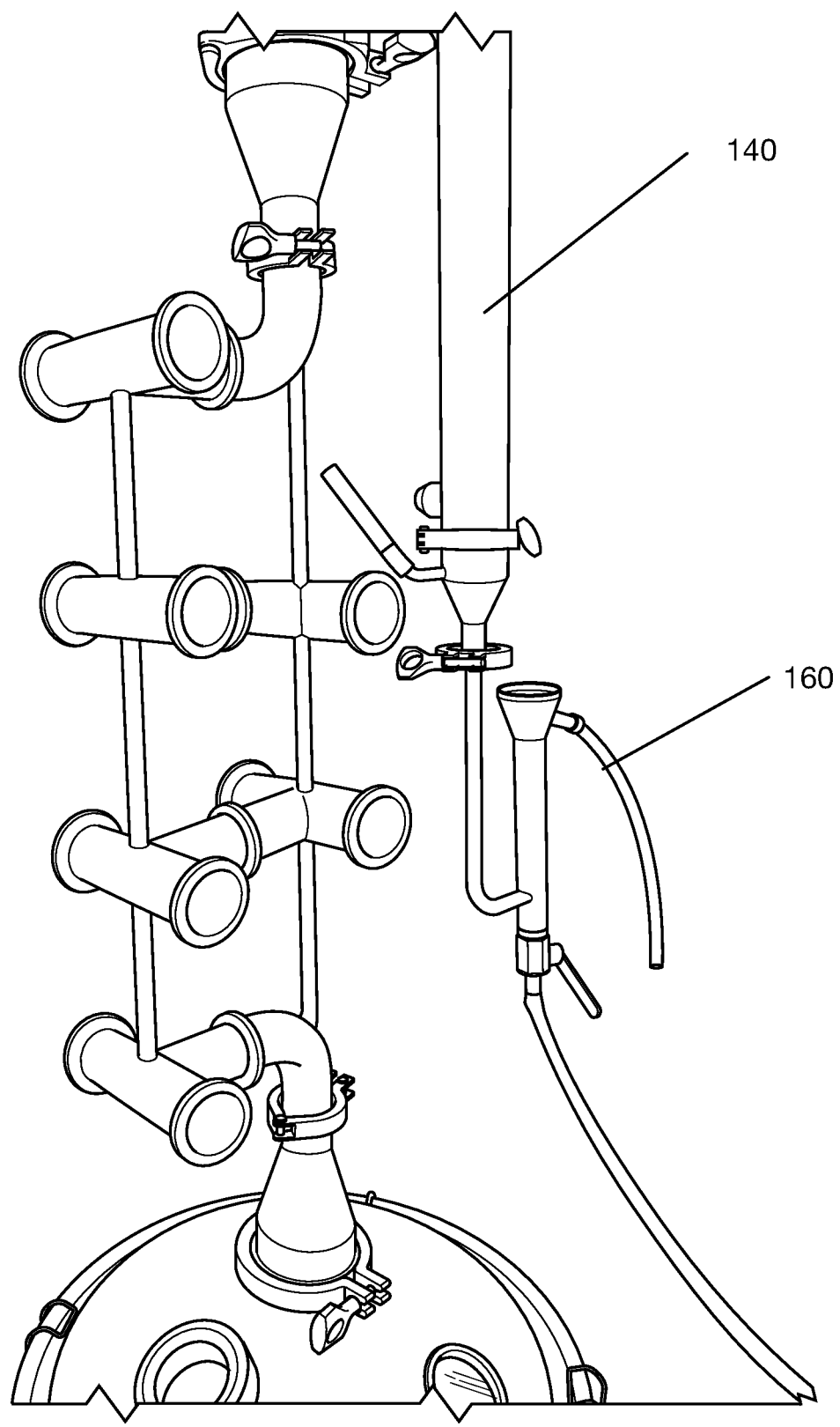
FIG. 11 shows another view of the disconnected liquor distillation system with a pot and portion of the system outlet.

FIGS. 2 and 3 show the channeled loops 110 including an entrance point 111, an exit point 113, a split point leading to the opposite subchannels 112, and a recombination point 113. The heated liquor enters the one or more channeled loops from the entrance point and travels to the split point where the heated liquor is split into two separate and opposite subchannels and recombined at the recombination point. One or more connection pipes 120 are adapted to connect the channeled loops to one another.

The system can also include at least one drain valve, and a liquor outlet through which the distilled liquor is dispensed. In some embodiments, the system can also include a reflux subsystem. The reflux subsystem is adapted to recombine the vapor flow before exiting the liquor distillation system and entering into the condensing system. In one embodiment, the reflux subsystem 210 and the condenser 140 are combined into one component 145 as shown in FIG. 3.

In one embodiment, the liquor distillation system is a tower system adapted to connect to an external pot 200 as shown in FIG. 1 or comes with a pot as part of the system. The pot is connectable to a heat source such that the temperature of the liquor can be raised.

In some embodiments, the liquor distillation system includes quick release attachments 130 such as quick release clamps or latches 130 for ease of cleaning. These can be throughout the connection pipes and a part of the channeled loops such that the system can be easily disconnected, cleaned and reconnected. When disconnected, the channeled loops have channeled loop subparts 110a as shown in FIGS. 8 through 11.

In an alternative embodiment, the liquor distillation system 100 includes a copper element 180 in the channeled loops 110. This can be a copper lining, a bubble plate and/or a copper mesh 180 adapted to reduce sulfur and enhance the flavors of the distilled liquor. In some embodiments as shown in FIG. 15, the copper element is tightly wound copper mesh 180 at the corner of each stage or each channeled loop. Here the liquor vapors and liquor fluids go through the copper for purification and filtration and to ensure that any unwanted oils, esters and contaminates are removed without stripping the liquor of its natural flavors and aromas.

In most embodiments, the liquor distillation system 100 has channeled loops 110 that split into two separate and opposite subchannels 112, these may be equidistant. In other embodiments, the stages 110 or channeled loops 110 can have more than two subchannels forcing the liquor fluids and vapors into multiple different directions, thereby slowing the travel rate of the fluid and resulting in a highly filtered liquor with very minimal contaminates, esters and oils. The system terminates in a liquor outlet 160 through which the distilled liquor is dispensed and collected with an external recipient 250.

In other embodiments, a plurality of channeled loops are connected via connection pipes 120. Here, the pipes 120 connect a plurality of channeled loops to one another, but also connect the stages/channeled loops to a condenser, to a pot, a system inlet, a system outlet, a gauge 190 for measuring pressure and/or temperature of the liquor inside the system as well as connecting the various components to a drain valve 150 or drain outlet. In one embodiment, the channeled loops are substantially rectangular.

In some embodiments, the channeled loops are vertically connected and vertically offset from one another via horizontal connection pipes, while in other embodiments the channeled loops are both vertically and horizontally offset to create a long system for the liquor to be forced through, thereby continuing to remove any unwanted contaminates, esters and oils.

The present disclosure aims to confine the liquor vapors into a smaller area to combine the aromas better, then reduce the pressure and slow the flow through the copper which is used as a filtration. This allows for the unwanted oils which are getting transported by the vapors to get removed, before the vapors are compressed to flow through the narrower opening again. By using the flow splitting system, it allows for the reduction of pressure for slowed filtration with minimal potential for aroma reduction. By dividing the flow then filtering it twice per side before recombining the flow and repeating this for a total of 3 times, allows for a clean yet full aroma and flavored spirit.

In accordance with one form of this disclosure, there is provided a method for distilling liquor using a liquor distillation system and comprising the steps of a) filling a pot with a liquor; b) placing a top attached to the liquor distillation system over the pot; c) connecting the pot to a heat source wherein when the liquor is being heated, the liquor vapors travel through one or more channeled loops wherein the liquor vapors are split into two opposite direction and reconnected at a recombination point for enhanced flavor prior to travelling to a sequential channeled loop; and wherein the distilled liquor vapors further travel through a condenser prior to exiting the system via a liquor outlet.

The present disclosure is different from the solution available in markets today. The pot still system is common in liquor distilling and includes a kettle or pot with a large bell of secondary cavity above the narrowed discharge area from the kettle. This is initially for the aromas to mingle and enhance, yet not get removed by excessive variations of filtration. This area or secondary chamber is usually packed with copper of some sort, and is the way that unwanted esters are removed or at best reduced. With a pot still, there is a slow flow of vapors.

The Reflux still is also a common liquor distillation system and has a smaller diameter than a bell of the equivalent volume pot still. It utilizes flutes or bubble plates to force the vapors into contact with the copper. A reflux still works at much higher pressures than a pot still, and requires the vapors to pass through the liquid which builds on the top side of each flute or bubble plate. This forces the vapors to come into contact with the unwanted and previously removed contaminates. The vapors are forced through small opening on the bottom side of each plate, and restricts the flow.

Here the liquor distillation system uses one or more channeled loops to force the liquor fluids and vapors into a flow splitting design, elongating the fluid's travel time, reducing the flow rate and ensuring a higher degree of filtration and purification. The liquor distillation system of the present disclosure can also include a reflux ensuring that the liquor fluids are sent back for additional filtration and purification and removal of any unwanted contaminates. Here, in addition to the plurality of channeled loops, the system also includes a reflux subsystem 210 to take some of the water out of the liquor, pushing it down while the liquor continues to travel through the system for distillation, filtration and purification while the water is taken out. Because of the difference in weight, the liquor continues going up through the system while the water, oil and contaminates are pulled down in the system. In other embodiments, the system also includes a condenser to convert the vapors back into liquid before exiting the system through a system outlet.

The current disclosure resolves the limitations posed by the solutions available in markets today including the pot still system and the reflux still system. The liquor distillation system of the present disclosure confines the vapors into a smaller area to combine the aromas better, then reduce the pressure and slow the flow through the copper which is used as a filtration. This allows for the unwanted oils which are getting transported by the vapors to get removed, before the vapors are compressed to flow through the narrower opening again. By using the flow splitting design, it allows for the reduction of pressure for slowed filtration with minimal potential for aroma reduction. By dividing the flow thanks to the channeled loops split point 114 terminating into two or more subchannels, then filtering it twice per side before recombining the flow and repeating this for a total of 3 times, allows for a clean yet full aroma and flavored spirit.

In some embodiments, the liquor is filtered and distilled about 6 or 7 times within the system and within the channeled loops while the pressure building up inside the system allows for aroma enhancing. The present disclosure can include as little as one channeled loop, however, preferred embodiments include at least three channeled loops for enhanced taste and flavors.

In some embodiment, all components of the liquor distillation system are removable and quickly disconnectable/reconnectable for ease of cleaning. In one particular embodiment, for 8 gallons of distilled liquor, a 1inch diameter pipe is used throughout the system, whereas for 130 gallons, a 4 inch pipe is used. For about 291 gallons, a 6 in diameter pipe is used and for about 518 to 520 gallons, an 8 inch pipe is used in the system. In one aspect, the present invention is embodied as a distillation tower, using and newly designed process for filtering and recombining the flow of vapors to increase aroma and retain flavor with alcohol production.

In one embodiment, the present disclosure includes multiple flow-splitting channels that allow for a distillate product to get filtered up to 6-7 times all while retaining full flavors. In other embodiments, the system allows almost all impurities to be removed to achieve an alcohol of a pH of about 9.8. The liquor distillation of the current disclosure allows distillation of fruit and elements that would normally not be distillable while achieving a smooth and palatable tase. Here, thanks to the flow splitting channeled loops, rare fruits can be distilled into flavorful and palatable liquors.

In one embodiment, the heating mechanism consists of a pot or kettle coupled to a boiler and a source of heat. Throughout the entire liquor distillation system, a corrosion resistant material that can withstand high temperatures is used.

As mentioned above, other embodiments and configurations may be devised without departing from the spirit of the invention and the scope of the appended claims.

The invention claimed is:

1. A liquor distillation system, comprising:
   one or more channeled loops fluidly couplable to a heating subsystem wherein the one more channeled loops include an entrance point, an exit point, a split point, and a recombination point such that a heated liquor enters the one or more channeled loops from the entrance point, to the split point where the heated liquor is split into two separate opposite subchannels and recombined at the recombination point;
   one or more connection pipes adapted to connect the one or more channeled loops to another channeled loop, such that the channeled loops are vertically nested and vertically offset from one another via one or more horizontal connection pipes; and
   a liquor outlet.

2. The liquor distillation system of claim 1 further comprising a condenser, the condenser adapted to condense alcoholic vapors from a heated liquor.

3. The liquor distillation system of claim 1 adapted to connect to a pot and a boiler.

4. The liquor distillation system of claim 1 further comprising a reflux subsystem.

5. The liquor distillation system of claim 1 further comprising quick release attachment for ease of cleaning.

6. The liquor distillation system of claim 1 wherein the one or more channeled loops further comprise a copper inside the one or more channeled loops, and wherein the copper is at least one of a copper lining, a bubble plate and a copper mesh adapted to reduce sulfur.

7. The liquor distillation system of claim 1 wherein two separate opposite subchannels of the one or more channeled loops are equidistant.

8. The liquor distillation system of claim 1 further comprising at least three channeled loops connected to one another via connection pipes.

9. The liquor distillation system of claim 1 further comprising one or more drain valves.

10. A liquor distillation system, comprising:
    one or more channeled loops fluidly couplable to a heating mechanism wherein the one or more channeled loops include an inlet, an outlet, a split point terminating into two or more subchannels, and a recombination point such that a heated liquor fluid travels through the two or more subchannels thereby increasing a fluid travel distance and slowing a liquor fluid flow rate and thereby removing impurities, such that the channeled loops are substantially rectangular;
    a condenser adapted to condense alcoholic vapors from a heated liquor; and
    a liquor outlet.

11. The liquor distillation system of claim 10 wherein the one or more channeled loops further comprise a copper element inside the one or more channeled loops, and wherein the copper is at least one of a copper lining, a bubble plate and a copper mesh adapted to reduce sulfur.

12. The liquor distillation system of claim 10 wherein the two or more subchannels are opposite and equidistant.

13. The liquor distillation system of claim 10 further comprising at least three channeled loops connected to one another via connection pipes.

14. The liquor distillation system of claim 11 wherein the channeled loops are vertically connected and vertically offset from one another via one or more connection pipes.

15. The liquor distillation system of claim 10 further comprising a reflux subsystem.

16. A liquor distillation system, comprising:
    one or more channeled loops fluidly couplable to a heating subsystem wherein the one more channeled loops include an entrance point, an exit point, a split point, and a recombination point such that a heated liquor enters the one or more channeled loops from the entrance point, to the split point where the heated liquor is split into two separate opposite subchannels and recombined at the recombination point;
    one or more connection pipes adapted to connect the one or more channeled loops to another channeled loop, such that the channeled loops are substantially rectangular; and
    a liquor outlet.

17. The liquor distillation system of claim 16, further comprising a copper element disposed at a corner of each channeled loop, the copper element configured to filter at least one of oil, ester, and contaminates from the heated liquor.

18. The liquor distillation system of claim 17, further comprising a reflux still subsystem comprising bubble plates, the reflux still subsystem directs vapors from the heated liquor to contact the copper element.

* * * * *